US011630578B2

(12) United States Patent
Devendrappa et al.

(10) Patent No.: US 11,630,578 B2
(45) Date of Patent: *Apr. 18, 2023

(54) ELECTRONIC SYSTEM WITH STORAGE MANAGEMENT MECHANISM AND METHOD OF OPERATION THEREOF

(71) Applicant: Samsung Electronics Co., Ltd., Suwon-si (KR)

(72) Inventors: Sushma Devendrappa, San Jose, CA (US); James Liu, Fremont, CA (US); Changho Choi, Fremont, CA (US); Xiling Sun, San Jose, CA (US)

(73) Assignee: Samsung Electronics Co., Ltd., Gyeonggi-Do (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/887,341

(22) Filed: May 29, 2020

(65) Prior Publication Data
US 2020/0293191 A1 Sep. 17, 2020

Related U.S. Application Data

(63) Continuation of application No. 16/397,543, filed on Apr. 29, 2019, now Pat. No. 10,747,443, which is a
(Continued)

(51) Int. Cl.
G06F 12/00 (2006.01)
G06F 13/00 (2006.01)
(Continued)

(52) U.S. Cl.
CPC ............ *G06F 3/061* (2013.01); *G06F 3/0616* (2013.01); *G06F 3/0655* (2013.01);
(Continued)

(58) Field of Classification Search
USPC ........................................................ 711/103
See application file for complete search history.

(56) References Cited

U.S. PATENT DOCUMENTS 6,484,235 B1   11/2002  Horst et al.
7,149,832 B2 * 12/2006  Wieland .................. G06F 9/468
                                                        710/269
(Continued)

FOREIGN PATENT DOCUMENTS

JP   2006235960 A   9/2006
WO  2012020544 A1  2/2012

*Primary Examiner* — Mohamed M Gebril
(74) *Attorney, Agent, or Firm* — Perspectives Law Group, Corp.

(57) ABSTRACT

An electronic system includes: a key value storage device, configured to transfer user data, the key value storage device including: a non-volatile memory array accessed by a key value address, an interface circuit, coupled to the non-volatile memory array, configured to receive a key value transfer command, a volatile memory, coupled to the interface circuit and the non-volatile memory array, configured to reduce a number of copies of the user data in the non-volatile memory array, and a device processor, coupled to the interface circuit, configured to manage the non-volatile memory array, the volatile memory, and the interface circuit by a key value index tree, including a key value translation block, to access the user data.

20 Claims, 6 Drawing Sheets

Related U.S. Application Data continuation of application No. 14/926,674, filed on Oct. 29, 2015, now Pat. No. 10,346,048.

(60) Provisional application No. 62/145,631, filed on Apr. 10, 2015.

(51) Int. Cl.
    *G06F 13/28*     (2006.01)
    *G06F 3/06*     (2006.01)
    *G06F 12/02*     (2006.01)

(52) U.S. Cl.
    CPC .......... *G06F 3/0659* (2013.01); *G06F 3/0679* (2013.01); *G06F 3/0688* (2013.01); *G06F 12/0246* (2013.01); *G06F 2212/1016* (2013.01); *G06F 2212/1036* (2013.01); *G06F 2212/7205* (2013.01); *G06F 2212/7211* (2013.01)

(56) References Cited

U.S. PATENT DOCUMENTS

| | | | |
|---|---|---|---|
| 7,756,817 B2 * | 7/2010 | Merchia | H03M 7/30 |
| | | | 707/999.102 |
| 8,248,861 B2 * | 8/2012 | Klein | G06F 13/1673 |
| | | | 365/185.33 |
| 8,375,012 B1 * | 2/2013 | Graefe | G06F 16/2246 |
| | | | 707/696 |
| 8,683,456 B2 | 3/2014 | Byom et al. | |
| 8,694,754 B2 | 4/2014 | Schuette et al. | |
| 8,700,834 B2 | 4/2014 | Horn et al. | |
| 8,782,344 B2 | 7/2014 | Talagala et al. | |
| 9,075,710 B2 | 7/2015 | Talagala et al. | |
| 9,201,825 B1 * | 12/2015 | Zhou | G06F 13/385 |
| 9,323,798 B2 | 4/2016 | Konik et al. | |
| 9,329,991 B2 | 5/2016 | Cohen et al. | |
| 9,405,621 B2 | 8/2016 | Yu et al. | |
| 9,438,426 B2 | 9/2016 | Li et al. | |
| 9,454,560 B2 | 9/2016 | Chu et al. | |
| 9,455,914 B2 * | 9/2016 | Singh | G06F 11/34 |
| 9,648,102 B1 * | 5/2017 | Davis | G06F 15/167 |
| 9,965,412 B2 * | 5/2018 | Liu | G06F 13/4022 |
| 10,346,048 B2 * | 7/2019 | Devendrappa | G06F 3/061 |
| 2001/0052093 A1 * | 12/2001 | Oshima | G11C 29/56 |
| | | | 714/704 |
| 2006/0117325 A1 | 6/2006 | Wieland et al. | |
| 2008/0065670 A1 * | 3/2008 | Cha | G06F 16/2329 |
| 2008/0215849 A1 * | 9/2008 | Scott | G06F 16/9014 |
| | | | 711/216 |
| 2011/0010347 A1 * | 1/2011 | Cheriton | G06F 12/0811 |
| | | | 711/108 |
| 2011/0010698 A1 | 1/2011 | Byom et al. | |
| 2011/0167207 A1 | 7/2011 | Klein | |
| 2012/0197900 A1 * | 8/2012 | Mandre | G06F 16/283 |
| | | | 707/743 |
| 2013/0060981 A1 * | 3/2013 | Horn | G06F 13/16 |
| | | | 710/107 |
| 2013/0067138 A1 | 3/2013 | Schuette et al. | |
| 2013/0185508 A1 | 7/2013 | Talagala et al. | |
| 2013/0275656 A1 * | 10/2013 | Talagala | G06F 12/0246 |
| | | | 711/103 |
| 2014/0059271 A1 * | 2/2014 | Meir | G06F 3/061 |
| | | | 711/103 |
| 2014/0201132 A1 | 7/2014 | Konik et al. | |
| 2014/0208004 A1 | 7/2014 | Cohen et al. | |
| 2014/0310574 A1 * | 10/2014 | Yu | G06F 11/1072 |
| | | | 714/773 |
| 2015/0074683 A1 | 3/2015 | Singh | |
| 2015/0142733 A1 * | 5/2015 | Shadmon | G06F 16/21 |
| | | | 707/769 |
| 2015/0302111 A1 | 10/2015 | Yue et al. | |
| 2015/0370720 A1 * | 12/2015 | Rowlands | G06F 12/0817 |
| | | | 711/133 |
| 2016/0099810 A1 * | 4/2016 | Li | H04L 9/0894 |
| | | | 713/193 |
| 2017/0103031 A1 * | 4/2017 | Liu | G06F 13/24 |
| 2017/0277451 A1 * | 9/2017 | Gole | G06F 11/004 |

* cited by examiner

ELECTRONIC SYSTEM WITH STORAGE MANAGEMENT MECHANISM AND METHOD OF OPERATION THEREOF

CROSS REFERENCE TO RELATED APPLICATION(S)

This application is a Continuation of co-pending U.S. patent application Ser. No. 16/397,543 filed Apr. 29, 2019. U.S. application Ser. No. 16/397,543 filed Apr. 29, 2019 is a Continuation of U.S. application Ser. No. 14/926,674 filed Oct. 29, 2015, now U.S. Pat. No. 10,346,048, issued on Jul. 9, 2019, and the subject matter thereof is incorporated herein by reference thereto. U.S. patent application Ser. No. 14/926,674 filed Oct. 29, 2015, now U.S. Pat. No. 10,346, 048, issued on Jul. 9, 2019, further claims the benefit of U.S. Provisional Patent Application Ser. No. 62/145,631 filed Apr. 10, 2015, and the subject matter thereof is incorporated herein by reference thereto.

TECHNICAL FIELD

An embodiment of the present invention relates generally to an electronic system, and more particularly to a system for data storage functions for electronic systems.

BACKGROUND

Modern electronic systems rely on rapid execution of programs and manipulation of data. The growing importance of "Big Data" databases is stressing the established data storage structures and processes. The term Big Data refers to huge volumes of data having a diverse and complex nature that is captured very quickly. Data is exploding at an astounding rate: up until 2003 approximately 5 exabytes of data was created, 90% of the data was structured data that was gathered through rational database management systems (RDBMS), and the rest was unstructured data. Currently, unstructured data is growing faster than structured data. Predictions are made that data will grow to 5 zettabytes by 2015. Unstructured data is growing faster than structured data. According to an International Data Corporation (IDC) study, 90% of all data created in the next decade will be unstructured data.

The logistics of storing Big Data databases exposes weakness in the technology of the SSD. Storage cell wear issues can include a limited number of reads allowed between each write, a limited number of writes before the cell becomes inoperative, erasures count as a write, erase required prior to writing, erasure can only be performed in larger capacity than that of write, and Flash memory can include imperfect cells, which need to be managed as bad blocks. The storage cell wear issues require constant maintenance as well as over-provisioning, which reserves additional capacity of the storage cells that is not available in the rated capacity available to the user. In order to accommodate the requirement of the Big Data databases and their uses, large capacity storage devices must be used. The typical uses of the Big Data can very quickly cause an SSD to experience degraded performance due to the background maintenance required to protect the data. Multiple reads of the data can reduce the retention reliability and multiple writes can physically damage the storage cells of the SSD. Normal operations of Big Data databases under block-level storage architecture can cause the block-level SSD to spend more time maintaining the reliability of the data than being able to accept new read/write commands.

Thus, a need still remains for electronic system with storage management mechanism to improve execution reliability and performance in clustered computing environments. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an electronic system includes: a key value storage device, configured to transfer user data, the key value storage device including: a non-volatile memory array accessed by a key value address, an interface circuit, coupled to the non-volatile memory array, configured to receive a key value transfer command, a volatile memory, coupled to the interface circuit and the non-volatile memory array, configured to reduce a number of copies of the user data in the non-volatile memory array, and a device processor, coupled to the interface circuit, configured to manage the non-volatile memory array, the volatile memory, and the interface circuit by a key value index tree, including a key value translation block, to access the user data.

An embodiment of the present invention provides a method of operation of an electronic system including: transferring user data by a key value storage device including: receiving a key value transfer command through an interface circuit includes connecting a device coupling structure to the interface circuit, selecting a non-volatile memory array, a volatile memory, or a combination thereof for reducing a number of copies of the user data in the non-volatile memory array accessed by a key value address, and managing a key value index tree, by a device processor, for transferring the user data between the interface circuit, the volatile memory, the non-volatile memory array, or a combination thereof includes accessing a key value translation block.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
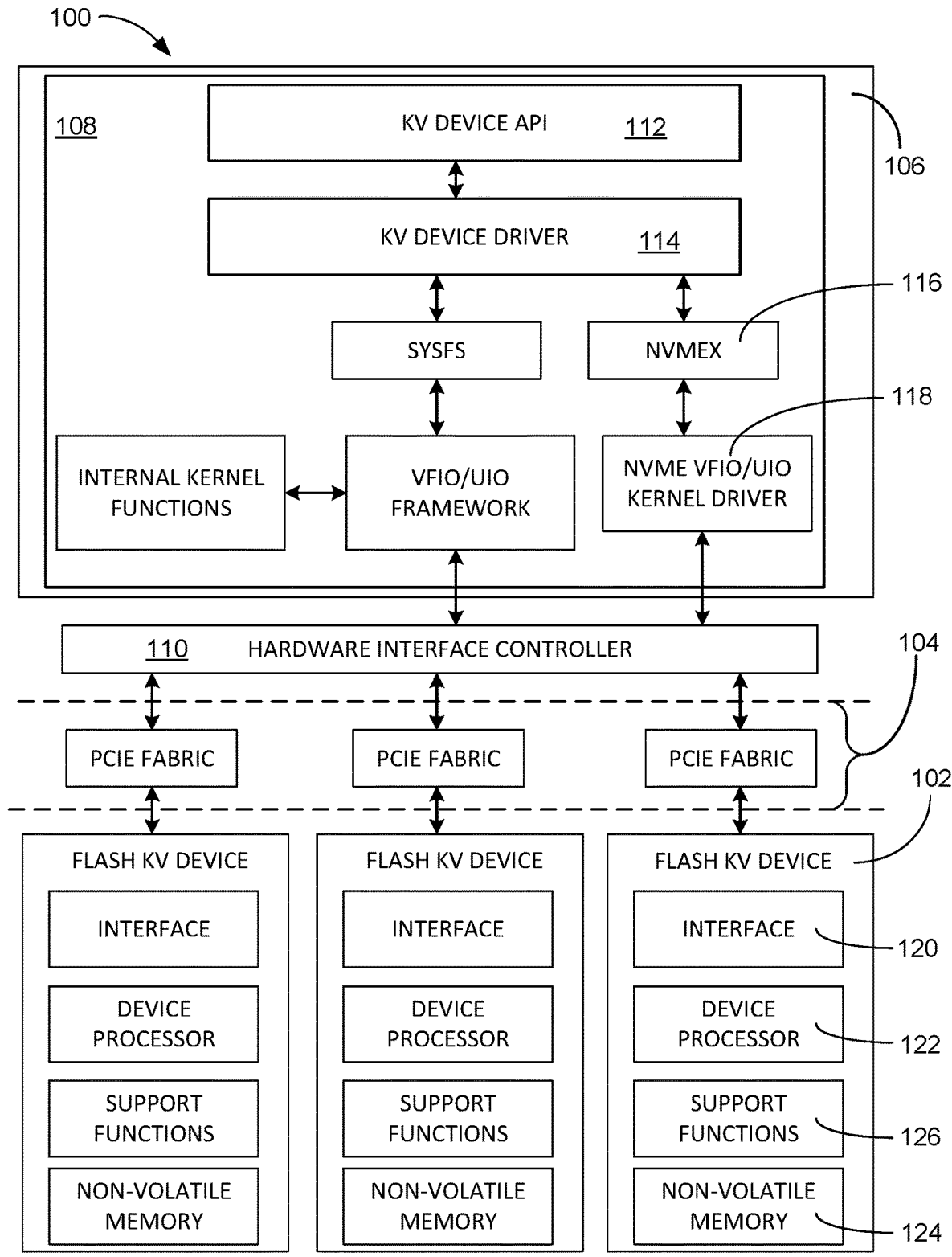
FIG. 1 is an architectural block diagram of an electronic system with storage management mechanism in an embodiment.

Various embodiments provide a data management mechanism for Big Data databases that can simplify the distributed input/output (I/O) interface and maximize the execution efficiency of the electronic system by establishing a less burdensome I/O architecture. The data management mechanism can be configured to process the data used in a user program without utilizing the I/O storage stack structure provided in the operating system. The execution of the data management mechanism can be executed at a user program level to provide efficient access to remote storage, local storage, and memory and provide the maximum program execution efficiency.

Various embodiments provide a data management mechanism for Big Data databases by omitting the customary I/O storage stacks required in operating system architectures. The data management mechanism also allows manipulation of the data based on a key value assigned to the data rather than a logical block address. The data management mechanism can operate in a host central processing unit (CPU) system memory, without making I/O calls through the operating system. The execution of the data management mechanism from the user defined space of the system memory can provide higher priority operation, while managing the operational characteristics of a key value storage device. This combination can increase the efficiency and operational performance of the data management mechanism.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

The term "unit" referred to herein is a circuit formed of hardware components or hardware state machines used for specific functions. The "unit" can be for timing critical functions and does not necessarily include software functions or support. The term "customary I/O storage stacks" referred to herein are memory segments within the host system memory that are used to hold address pointers and interrupt flags for input/output (I/O) operations performed by the operating system. The customary I/O storage stacks insert a latency to the I/O in order to load the memory with interrupt pointers to service the transfer of data to or from the I/O device based on servicing the interrupt associated with the transfer.

Referring now to FIG. 1, therein is shown an architectural block diagram of an electronic system 100 with a data management mechanism in an embodiment. The electronic system 100 includes a key value storage device 102, examples of such devices can include solid state storage devices (SSSD) based on Flash memory, magnetic random access memory (MRAM), Resistive Random Access Memory (RRAM), and Phase Change Memory (PCM), as well as hybrid disk storage devices, and key value storage adapters, which are addressed by way of a key value for identifying file structures. The key value storage device 102 can be a non-volatile data storage mechanism that stores and accesses user data by way of key value addressing. The key value storage device 102 can be used for data processing in a computing environment for managing big data databases.

A device coupling structure 104 can link the key value storage device 102 to a host processor 106. The device coupling structure 104 can be an input/output interface structure connected between the host processor 106 and the key value storage device 102. The device coupling structure 104 can include a peripheral computer interface express (PCI-e), fiber channel (FC), small computer system interface (SCSI), or serial attached SCSI (SAS), and the host's memory channel interface. The device coupling structure 104 can be implemented as a memory bus for host internal application of the electronic system 100. The device coupling structure 104 can provide local or remote connectivity between the host processor 106 and the key value storage device 102. The connection of the device coupling structure 104 between the key value storage device 102 and the host processor 106 is performed in a manner that meets the specification of the device coupling structure 104.

The device coupling structure 104 can provide direct coupling and communication to the key value storage device 102 as well as standard storage devices (not shown). It is understood that the communication with standard storage devices requires the I/O calls provided by the operating system and may utilize a logical block address (LBA) architecture. Since the key value storage device 102 does not use the LBA architecture, the communication from the host processor 106 must be structured in a key value based linear storage architecture.

The host processor 106 can be a general purpose computer, a computer network, a server, a storage processor, GPU, ASIC, FPGA, PLD, or the like. The host processor 106 can include a system memory 108, a hardware interface controller 110, and a control processor (not shown). The host processor 106 can execute a key value device application program interface (API) 112 and a key value device driver 114. It is understood that the system memory 108 can be outside the physical bounds of the host processor 106. The hardware interface controller 110 is a hardware adapter that controls the electrical and timing parameters associated with the device coupling structure 104.

The key value device API 112 provides an application interface that allows user applications to access the key value storage device 102 without having a description of the operational characteristics of the key value storage device 102. The key value device API 112 is a program that translates standard Application instructions into a form that is recognized by the key value device driver 114. The key value device API 112 passes the application requirements to the key value device driver 114 for conversion to interface commands that are recognized by the key value storage device 102.

The key value device driver 114 can communicate with a physical interface conditioning block 116, such as Non-Volatile Memory Express (NVMe) or the Linux kernel virtual file system (sysfs). The physical interface conditioning block 116 can provide formatted commands to a universal Input/Output (UIO) kernel driver 118, such as an NVMe UIO kernel driver or a UIO framework with internal kernel functions provided by another block. The physical interface conditioning block 116 is a program that can add required information used by the hardware interface controller 110 to access the device coupling structure 104. The UIO kernel driver 118 is a program that can manage and regulate the interrupt timing for the hardware interface controller 110.

The UIO kernel driver 118 can communicate through the hardware interface controller 110 to the device coupling structure 104 and on to the key value storage device 102. The physical interface conditioning block 116, the UIO kernel driver 118, the hardware interface controller 110, and the device coupling structure 104 provide a communication transfer mechanism between the key value device driver 114 and the key value storage device 102.

The key value storage device 102 can include a hardware interface 120 for coupling to the device coupling structure 104. The hardware interface 120 can be hardware structure that manages the communication and timing between the key value storage device 102 and the device coupling structure 104. The hardware interface 120 can be controlled by a device processor 122, which can implement a key value flash translation layer (KVFTL), for managing the geometry of a non-volatile memory array 124, and support functions 126, which can include garbage collection, wear leveling, bad block management, and command execution. The key value storage device 102 can provide the support functions 126 for expiry, multi-version concurrency control (MVCC), and available storage collection and management. The support functions 126 can include hardware and microcode for supporting the execution of the KVFTL. The hardware associated with the support functions 126 can include memory, register files, sequential state machines, multiplexers, error checking devices, and power monitoring devices. The device processor 122 can include a microprocessor, an embedded processor, a sequential state machine, or a microcomputer. The non-volatile memory array 124 can be an array of non-volatile memory devices including flash memory, magnetoresistive random access memory, Ferroelectric random access memory, or phase-change random access memory.

The key value storage device 102 can provide increased performance by not utilizing the standard block level architecture. The user applications that access the key value storage device 102 are not required to maintain indexing structures in order to search for specific data. A key value that is unique to the data is stored by the user application to locate specific data structures and all indexing functions are performed by the key value storage device 102.

The support functions 126, of the key value storage device 102, can manage the non-volatile memory array 124 as a linear addressable space with bad blocks masked out. The device processor 122 can maintain a key value index list to facilitate the indexing of user data without support from the host processor 106.

It has been discovered that the electronic system 100 can enhance performance of the storage management by reducing the I/O overhead in the host processor 106 by removing the concept of a logical block address in favor of a key value that can define the user data while leaving the identification of the location and extent of the user data to the key value storage device 102. The device processor of the key value storage device 102 can maintain a key value index list that can accommodate expiry, MVCC, and read/write access.

Figure 2:
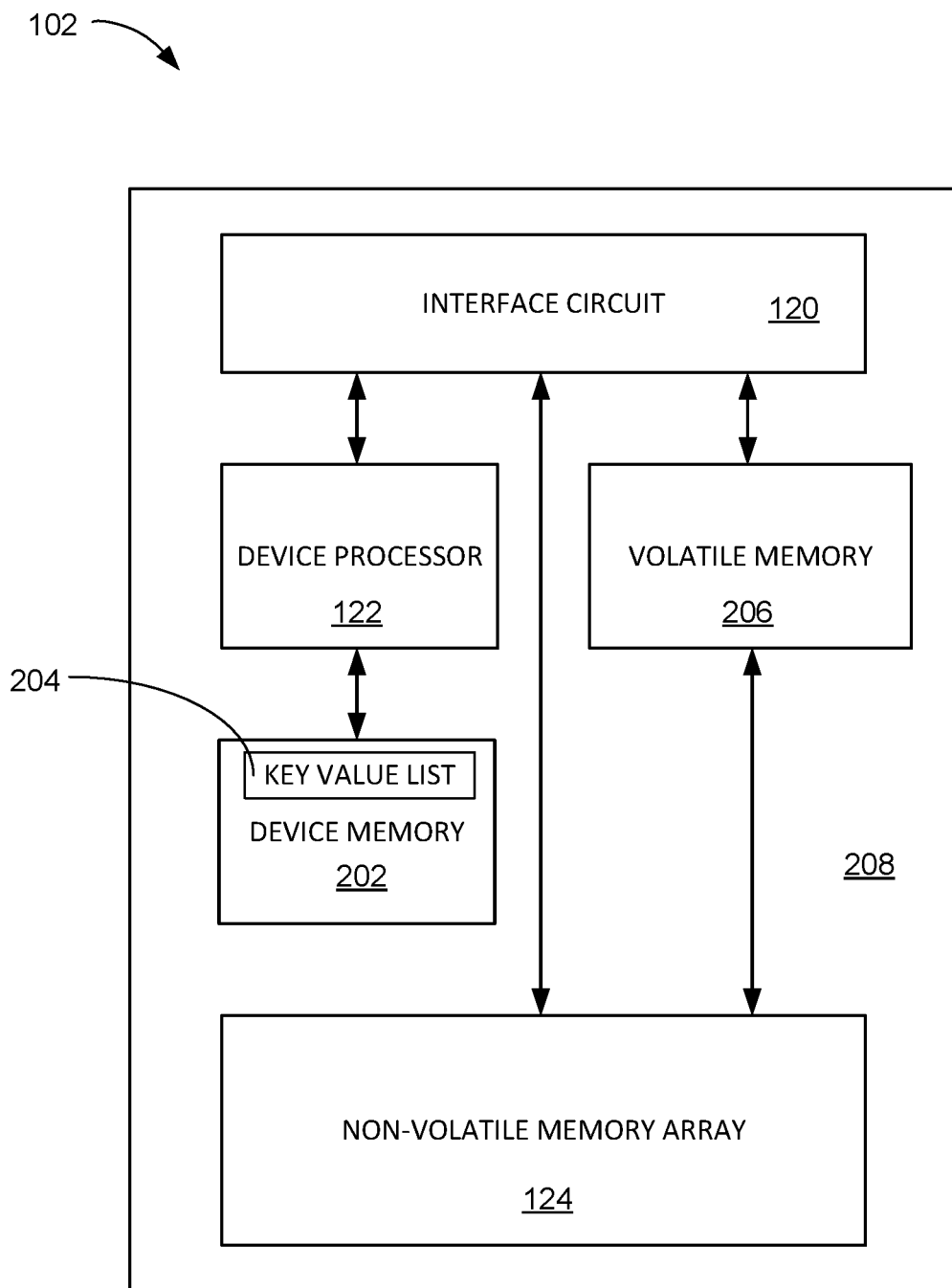
FIG. 2 is a hardware block diagram of a flash defined key value store device in an embodiment.

Referring now to FIG. 2, therein is shown a hardware block diagram of a flash defined key value store device in an embodiment. The hardware block diagram of the flash defined key value store device 102 depicts the interface circuit 120, such as a peripheral computer interface express (PCI-e), fiber channel (FC), small computer system interface (SCSI), serial attached SCSI (SAS), or the like, that can deliver the key value storage commands and data through the device coupling structure 104 of FIG. 1. The device processor 122, such as a bit slice processor, a microprocessor, a hardware sequential state machine, an embedded microprocessor, an FPGA, an ASIC, a microcomputer, or the like, can be coupled to the interface circuit 120 in order to receive key value commands, prepare the interface circuit 120 for routing user data, manage stored data, or providing status to the host processor 106 of FIG. 1.

The device processor 122 can be coupled to a device memory 202, which can include volatile memory, non-volatile memory, or a combination thereof. It is understood that the interface circuit 120, the device processor 122, and the device memory 202 can be integrated into a single component, such as a system-on-a-chip (SOC), a gate array, a custom logic chip, a field programmable gate array, or an application specific integrated circuit (ASIC). The device memory 202 can store the key value associated with the user data received through the interface circuit 120. A key value index list 204 can be stored in the device memory 202 and maintained by the device processor 122 for all of the support functions 126 of FIG. 1. The key value index list 204 will link the key value with a physical location of the user data.

A volatile memory 206 can be coupled to the interface circuit 120. The volatile memory 206 can be used as a data cache and can be accessed by the device processor 122 through the interface circuit 120. A non-volatile memory array 124 can be coupled to the volatile memory 206 and the interface circuit 120 in order to provide reduced latency access to user data written to the volatile memory 206, the non-volatile memory array 124, or both. The interface circuit 120 can be configured to concurrently write both the volatile memory 206 and the non-volatile memory array 124 in order to support the MVCC function. The device processor 122 can manipulate the user data in the volatile memory 206 and the non-volatile memory array 124 through the interface circuit 120. The interface circuit 120 can actively transfer user data to or from one of the volatile memory 206 and the non-volatile memory array 124 while the device processor 122 can concurrently access the other of the volatile memory 206 and the non-volatile memory array 124.

The device processor 122 can execute the support functions 126 of FIG. 1 while the interface circuit 120 is actively transferring user data to the volatile memory 206 or the non-volatile memory array 124 without adding latency to the transfer of the user data. The non-volatile memory array 124 can include a number of flash memory integrated circuits coupled in the array format on a key value device circuit board 208.

It has been discovered that an embodiment of the key value storage device 102 can reduce the write amplification factor as compared to a logical block address (LBA) device. The support functions 126 can produce fewer copies of the user data during garbage collection and wear leveling. The support functions 126 can take advantage of the device architecture by utilizing the volatile memory 206 as a bridge device to hold temporary copies of the key value data blocks, rather than making multiple copies within the non-volatile memory array 124. This technique can reduce the number of write operations applied to the non-volatile memory array 124 and reduce the burden of the garbage collection because the volatile memory 206 can be used without generating additional cell utilization within the non-volatile memory array 124.

Figure 3:
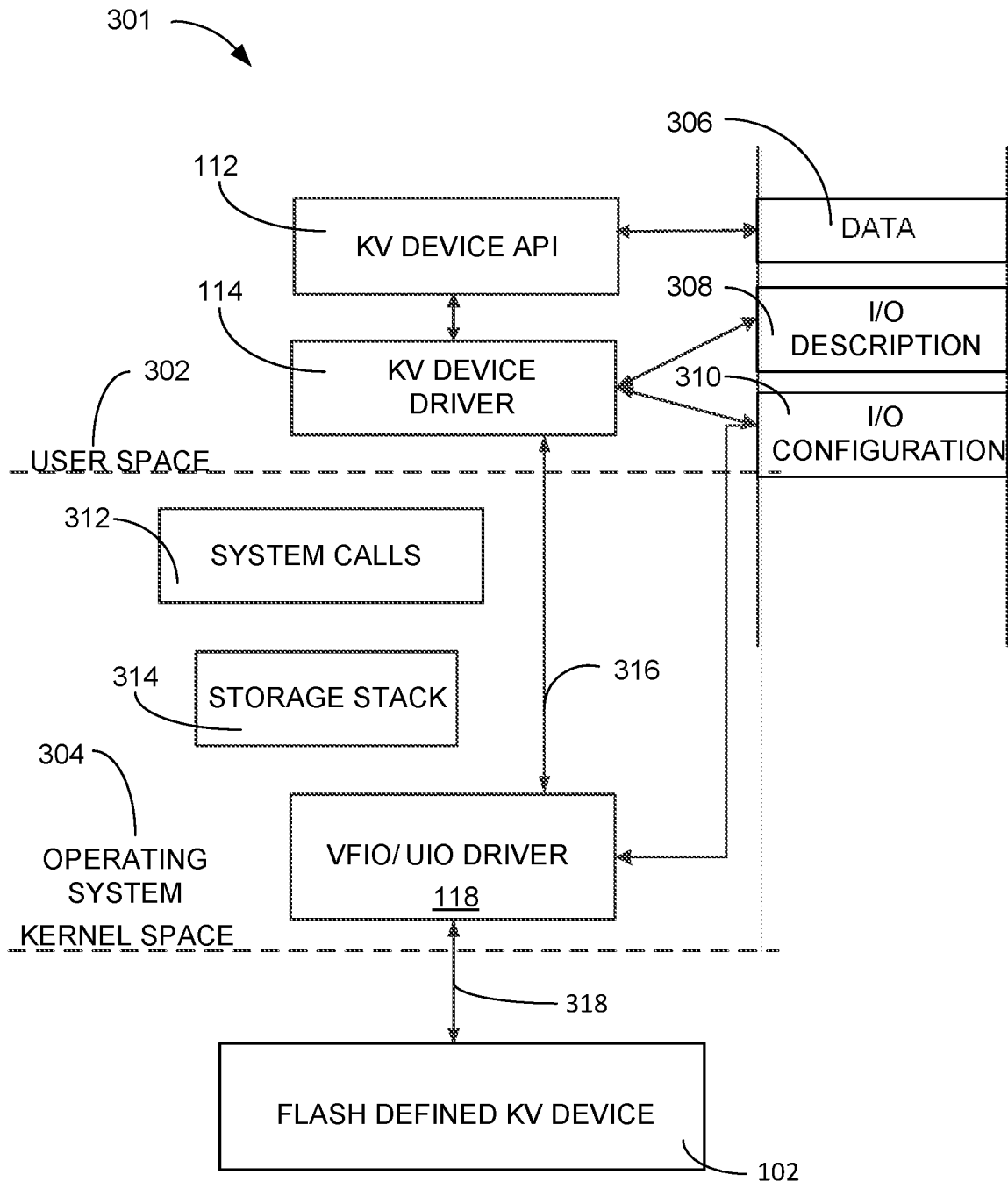
FIG. 3 is a software functional block diagram of an electronic system with storage management mechanism in an embodiment.

Referring now to FIG. 3, therein is shown an architectural block diagram of an electronic system 301 with storage management mechanism in an embodiment. The architectural block diagram of the electronic system 301 can depict a user space 302 and an operating system kernel space 304 within the system memory 108 of FIG. 1.

The user space 302 can be utilized by user applications for preparing user data 306 for transfer to the key value storage device 102. The key value device API 112 can pass the user data 306 to the key value device driver 114 for configuration to an I/O compatible format. The key value device driver 114 can access an I/O description 308 and an I/O configuration 310 in order to correctly format the user data 306 for the UIO kernel driver 118 for direct transfer to the key value storage device 102.

It has been discovered that the electronic system 301 can reduce the latency of the transfer of the user data 306 by bypassing the system calls 312 and the I/O storage stack 314 that are normally associated with I/O operations. The system calls 312 and the I/O storage stack 314 operate in the operating system kernel space 304 of the system memory 108. The operating system kernel space 304 is normally utilized during system interrupts, which can add operating system latency to the I/O operation. By executing the UIO kernel driver 118 directly from the key value device driver 114, the user data 306 can be transferred as a key value transfer command 316 from the user space 302 to the key value storage device 102 without waiting for a system interrupt to occur. The key value storage device 102 can monitor the indexing of the user data 306 based on the unique key value associated with the user data 306, which can reduce the amount of the system memory 108 and latency needed to save the information from the I/O storage stack 314. By reducing both the latency and the amount of the system memory 108 utilized by the I/O storage stack 314, the electronic system 301 can enhance performance and reduce the power required for the transfer of the user data 306.

The UIO kernel driver 118 can convert the key value transfer command 316 to a key value transfer 318. The key value transfer 318 can be a key value command for the key value storage device 102 for a transfer of the user data 306 to satisfy the key value transfer command 316. The device processor 122 of FIG. 2 can interpret the key value transfer 318 in order to manage the transaction of the user data 306 with the volatile memory 206 of FIG. 2, the non-volatile memory array 124 of FIG. 1, or both concurrently. Once the device processor 122 can receive the key value transfer command 316, the interface circuit 120 can be configured to send or receive the user data 306. The user data 306 can be transferred between the interface circuit 120 and the volatile memory 206, the non-volatile memory array 124, or both concurrently, in the case of a multi-version concurrency control (MVCC) operation.

Figure 4:
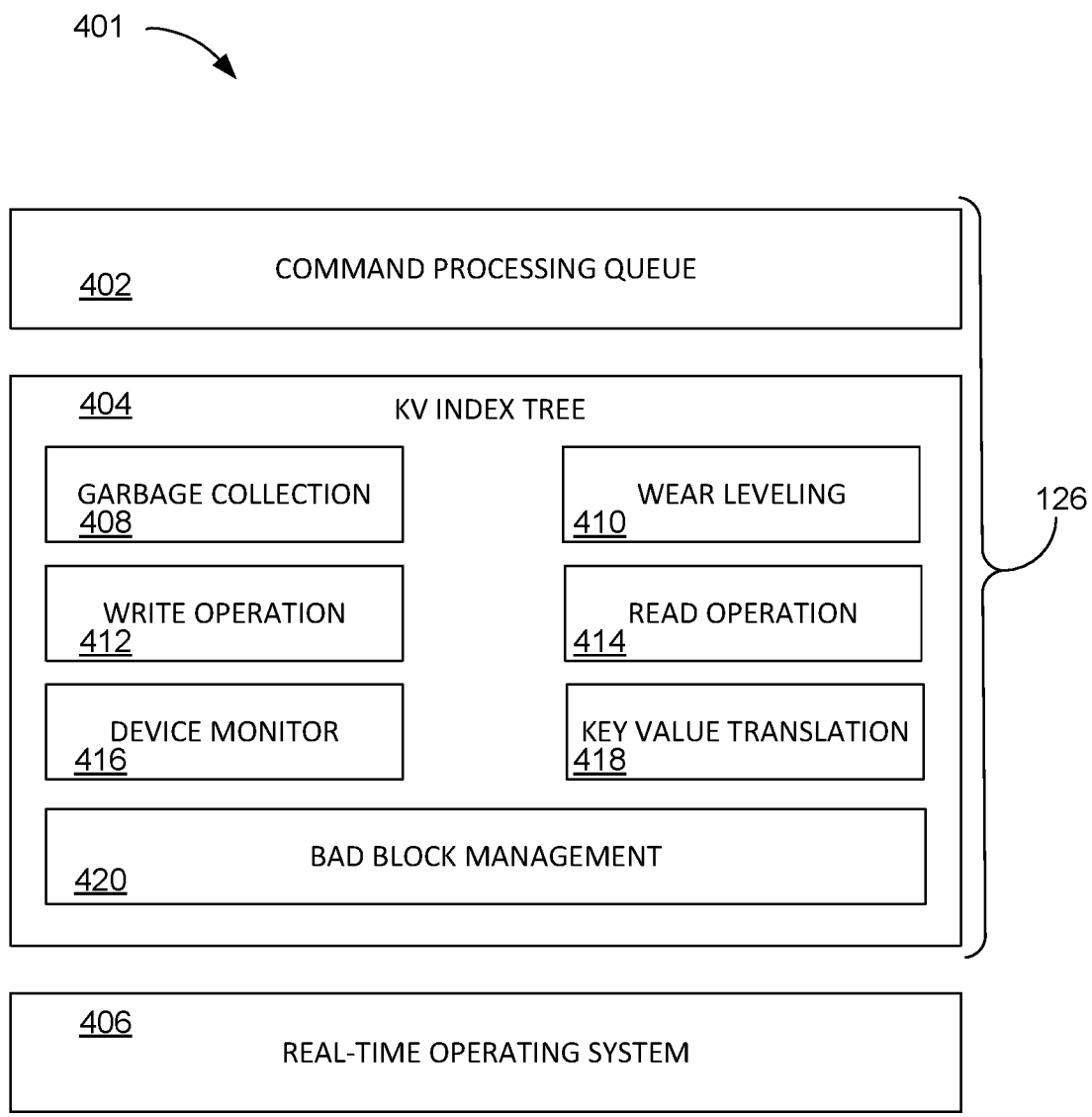
FIG. 4 is a functional block diagram of an operating software of a key value storage device in an embodiment.

Referring now to FIG. 4, therein is shown an operational block diagram of a key value storage device 401 in an embodiment. The operational block diagram of the key value storage device 401 depicts the support functions 126 executed by the device processor 122 of FIG. 2 including a command processing queue 402, a key value index tree 404, and a device real-time operating system (RTOS) 406.

The command processing queue 402 can manage queued commands from the key value device driver 114, while coordinating access of the key value index tree 404 by the device processor 122 of FIG. 1. The command processing queue 402 can configure the device coupling structure 104 for direct communication to the key value device driver 114 by addressing the requests and responses to the address of the key value device driver 114 in user space 302 of FIG. 2. The command processing queue 402 can set-up the interface circuit 120 of FIG. 2 to optimize the access for the device processor 122 without adding latency to the transfer of the user data 306 of FIG. 3 by implementing a direct communication to the key value device driver 114 of FIG. 3 and bypassing the system calls 312 of FIG. 3 and the storage stack 314 of FIG. 3 the electronic system 100 of FIG. 1. Thus the command processing queue 402 can significantly reduces the latency between the key value transfers 318 because the transfers occur as operations in user space 302 that do not wait for system interrupt processing to occur.

The key value index tree 404 can include a garbage collection block 408, a wear leveling block 410, a write operation monitor 412, a read operation monitor 414, a device monitor 416, a key value translation block 418, and a bad block management module 420 for supporting the non-volatile memory array 124 of FIG. 1. The key value index tree 404 can maintain the operational readiness of the key value storage device 102 of FIG. 1 without adding latency to the transfer of the user data 306. The key value index tree 404 can be managed by the device processor 122 in order to maintain the current location of the user data 306 contained in the volatile memory 206 of FIG. 2 and the non-volatile memory array 124. The device processor 122 can establish rules governing the execution of the garbage collection block 408 and the wear leveling block 410 in order to preserve multiple versions of the user data 306 associated with the same key.

The garbage collection block 408 can reduce the write amplification factor by utilizing a portion of the volatile memory 206 of FIG. 2 to store still valid data while performing an erase of expired or invalid blocks of the user data 306. The reduction in the write amplification factor can extend the operable life of the key value storage device 102, well beyond that of a solid state drive (SSD), while maintaining the high performance and reduced latency that makes the key value storage device 102 desirable. Any of the valid data displaced due to the garbage collection block 408 is readily available for transfer to the interface circuit 120 if required. This process is necessary because the user data 306 can be written in 4 KB to 8 KB pages but an erase can impact (for example) 64 such pages at a time.

The wear leveling block 410 can manage the distribution of the writes of the user data 306, to keep the charge distribution in the non-volatile memory array 124 in balance, and prevent exceeding the lifetime write limit of cells in any area of the non-volatile memory array 124. The wear leveling block 410 can configure over-provisioned portions of the non-volatile memory array 124 for use when replacing worn or faulty blocks, as part of the wear leveling process. Since the write amplification factor is reduced for the key value storage device 102, the wear leveling block 410 can be invoked less frequently than in products based on logical block address (LBA) access.

The write operation monitor 412 can configure the interface circuit 120 to communicate directly to the key value device driver 114 to provide a low latency path to the volatile memory 206, the non-volatile memory array 124, or a combination thereof. The write operation monitor 412 can receive a key value pair for the user data 306 associated with the write command. The key value pair can be stored in the key value index list 204 of FIG. 2 in order to access the user data 306 at a later time. Upon completion of the write operation, the write operation monitor 412 can configure the status to be returned by the interface circuit 120.

The read operation monitor 412 can configure the interface circuit 120 after verifying the key value, received for the read command, is valid. The read operation monitor can configure the interface circuit 120 to communicate directly to the key value device driver 114 to provide a low latency path for the user data 306 read from the volatile memory 206, the non-volatile memory array 124, or a combination thereof. At the completion of the read operation, the read operation monitor 414 can configure the status to be returned by the interface circuit 120.

The device monitor 416 can detect error or warning conditions associated with the general operation of the key value storage device 102, such as data errors, timeout of operations, hardware warnings, or command exceptions. The device monitor 416 can provide recovery strategies for recoverable errors or warnings, provide status to the interface circuit 120 for unrecoverable errors, and can transfer the contents of the volatile memory 206 to a reserved portion of the non-volatile memory array 124 upon notification of power loss or shut down. The recovery strategies can include retries, data error correction, retransmission, or emergency back-up to the reserved portion of the non-volatile memory array 124. The key value storage device 102 can include a charge storage device or small battery in order to maintain control during the power-down processing.

The key value translation block 418 can receive key value pairs from the write operation monitor 412 and add the key value to the key value index list 204 of FIG. 2 with the physical location in the volatile memory 206 or the non-volatile memory array 124. The "key" portion of the key value pair is used to index the physical location of the "value" portion, which can be the user data 306 or a pointer to the physical location of the user data 306. For read operations the key value translation block 418 can verify the key value received with the read command is located in the key value index list 204 and provide the physical address of the user data 306 to the read operation monitor 414 for configuration of the interface circuit 120 and transfer the user data 306.

The bad block management module 420 can tag all blocks within the non-volatile memory array 124 that contains a page with an unrecoverable error. The bad block management module 420 can receive error indications from the garbage collection block 408, the wear leveling block 410, the write operation monitor 412, the read operation monitor 414, the device monitor 416, or a combination thereof.

The device RTOS 406 can enable the device processor 122 to provide system level supervision and timing prompts for the support functions 126. The device RTOS 406 can provide system level timing functions, diagnostic capabilities, system recovery processes and reset management.

It is understood that other partitions of the support functions are possible without changing the operation of the key value storage device 102. By way of an example, the write operation monitor 412, the read operation monitor 414, the device monitor 416, and the key value translation module 418 could be combined in a single module or further partitioned to provide other more detailed module functions.

It has been discovered that the support functions 126 of the key value storage device 102 can provide low latency access to the user data 306 stored in the volatile memory 206 or the non-volatile memory array 124 with a simplified command interface structure without using logical block address architecture. This can reduce the use of the system memory 108 of FIG. 1 while increasing performance due to bypassing the system calls 312 of FIG. 3 and the storage stack 314 of FIG. 3, which are used to support the LBA architecture.

Figure 5:
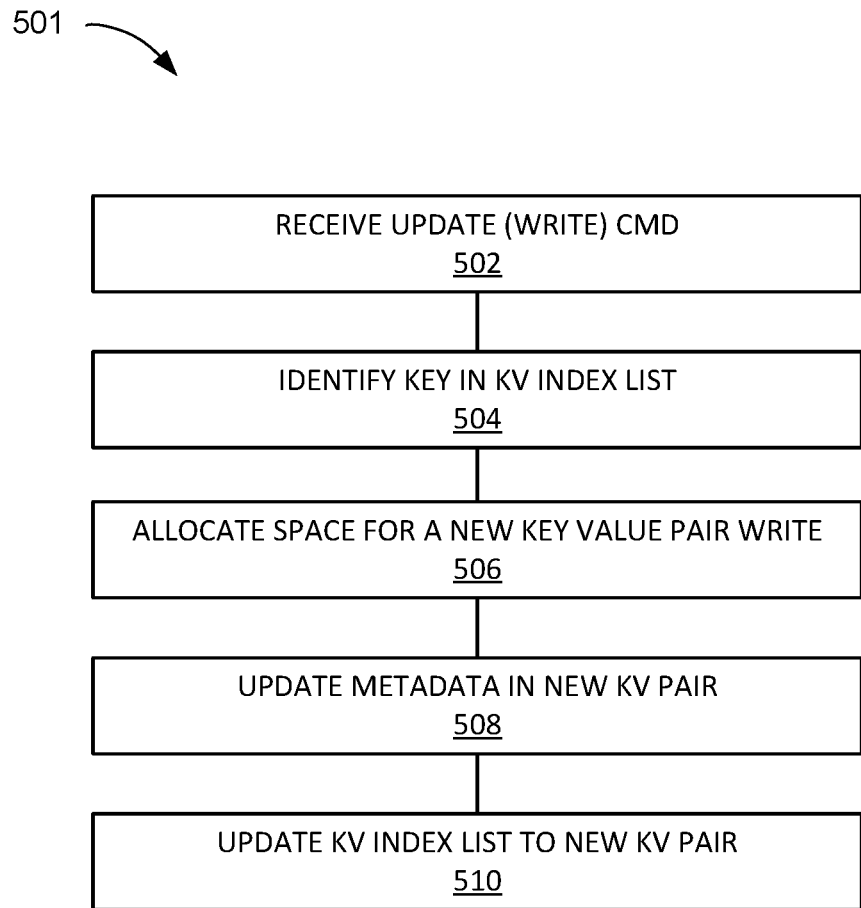
FIG. 5 is a flow chart of a MVCC operation in an embodiment.

Referring now to FIG. 5, therein is shown a flow chart of a MVCC operation 501 in an embodiment. The flow chart of the MVCC operation 501 depicts receiving an update command at step 502, such as a write command, updating an existing file, received through the interface circuit 120 of FIG. 2. The device processor 122 of FIG. 2 can identify the key value from the key value transfer command 316 of FIG. 3.

The device processor 122 then proceeds to identify the key at step 504 in the key value index list 204 of FIG. 2 to determine whether the user data 306 of FIG. 3 already exists in the electronic system 100 and to identify that the update command is valid. Upon identifying that the user data 306 does exist, the device processor 122 can allocate a location for the new key value pair at step 506, which can be added to the key value index list 204.

The device processor 122 can update metadata in the new key value pair location at step 508. The key value index list 204 can include, for each key value entry, a link pointer to identify previous versions of the key value in order to provide a history of the value associated with the key. Since the non-volatile memory array 124 of FIG. 2 cannot perform an overwrite of the existing location, the older version of user data 306 associated with the key remains available. 1 during background support operations. In multi-host environments, this feature can allow access to multiple versions of the original data set and allow each host to perform updates.

By way of an example, the key can identify a data set and the value can indicate a version number of the data set. The metadata can include the version number and pointers to the physical location of the indicated version. In an embodiment, the device processor can assign limits to the number of different values associated with a single key. It has been discovered that the electronic system 100 can provide a back-up process to restore a data set to a previous version with a single key value read command.

The device processor 122 can update the key value index list 204 to include the new key value pair at step 510. The key value index list 204 can include the link pointer to the previous key value pair location, the key provided from the command, and metadata, which includes the value associated with the key and physical pointers to the location of the user data 306 associated with the data set.

It has been discovered that the electronic system 100 can support multiple versions of the same data set concurrently. This feature is further supported by the use of the volatile memory 206 of FIG. 2 with the garbage collection block 408 and the wear leveling block 410, which can substantially reduce the number of times the same data set is replicated. By transferring any active data in an erase block to the volatile memory 206, it is not necessary to consume more of the non-volatile memory array 124 for the support functions 126.

Figure 6:
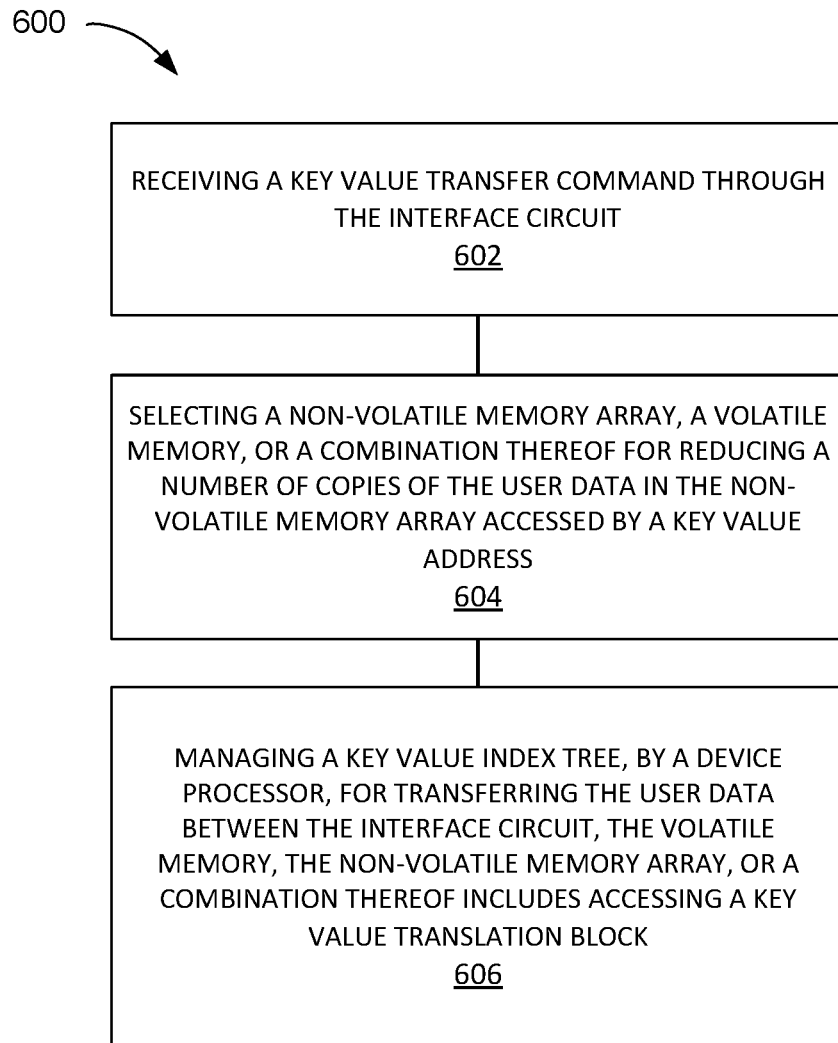
FIG. 6 is a flow chart of a method of operation of an electronic system in a further embodiment of the present invention.

Referring now to FIG. 6, therein is shown a flow chart of a method 600 of operation of an electronic system 100 in a further embodiment of the present invention. The method 600 includes: transferring user data between the key value device driver 114 of FIG. 1 and the interface circuit 120 of FIG. 1, without experiencing the normal delay caused by the I/O storage stack 314 of FIG. 3, using a key value storage device 102 of FIG. 1. The method 600 includes: receiving a key value transfer command 316 of FIG. 3 through the interface circuit 120 includes connecting a device coupling structure 104 of FIG. 1 to the interface circuit 120 in a block 602, selecting a non-volatile memory array 124 of FIG. 1, a volatile memory 206 of FIG. 2, or a combination thereof for reducing a number of copies of the user data 306 of FIG. 3 in the non-volatile memory array 124 of FIG. 1 accessed by a key value address in a block 604, and managing a key value index tree 404 of FIG. 4, by the device controller 122 of FIG. 1, for transferring the user data 306 between the interface circuit 120, the volatile memory 206, the non-volatile memory array 124, or a combination thereof includes accessing a key value translation block in a block 606.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An electronic system comprising:
    a key value storage device, configured to transfer user data through a device coupling structure, the key value storage device including:
        a non-volatile memory array accessed as a linear addressable space, by a key value transfer, based on a key value index list that links the key value to the physical location of the user data and maintains one or more support functions, the one or more support functions comprising garbage collection, wear leveling, bad block management, and multi-version concurrency control (MVCC),
        an interface circuit, coupled to the non-volatile memory array, configured to receive a key value transfer command, and
        a device processor, coupled to the interface circuit, configured to manage the non-volatile memory array and the interface circuit utilizing a key value index tree for communicating with a key value device driver to access the user data.

2. The system as claimed in claim 1, wherein the key value storage device includes a device memory configured to store the key value index tree providing access to multiple versions of the user data linked through the key value index tree.

3. The system as claimed in claim 1, wherein the key value storage device includes the device processor configured to execute a real-time operating system to coordinate support functions.

4. The system as claimed in claim 1, wherein the device processor is configured to execute a garbage collection block on the non-volatile memory array that includes the user data temporarily held in a volatile memory.

5. The system as claimed in claim 1, wherein the device processor is configured to execute a wear leveling block on the non-volatile memory array.

6. The system as claimed in claim 1, wherein the device processor is configured to access a previous version of the user data by accessing metadata, for the key value, that identifies a location of the previous version of the user data.

7. The system as claimed in claim 1, wherein the device processor is configured to execute a read operation or a write operation based on the key value index list.

8. The system as claimed in claim 1, wherein the interface circuit is configured to accept the key value transfer through a device coupling structure includes the key value device driver accessed to provide direct communication through the device coupling structure and bypassing customary I/O storage stacks.

9. The system as claimed in claim 1, wherein the interface circuit is configured to accept the key value transfer generated by the key value device driver loaded in a system memory of a host processor.

10. The system as claimed in claim 1, wherein the interface circuit is configured to accept the key value transfer generated by a key value device driver loaded in a user space of the system memory of a host processor.

11. A method of operation of an electronic system comprising:
    transferring user data by a key value storage device including:
        receiving a key value transfer command through an interface circuit,
        selecting a non-volatile memory array accessed as a linear addressable space, by a key value transfer, based on a key value index list that links the key value to the physical location of the user data and maintains one or more support functions, the one or more support functions comprising garbage collection, wear leveling, bad block management, and multi-version concurrency control (MVCC), and
        managing a key value index tree, by a device processor, for transferring the user data between the interface circuit and the non-volatile memory array includes communicating with a key value device driver.

12. The method as claimed in claim 11 further comprising: storing the key value index tree in a device memory coupled to the device processor providing access to multiple versions of the user data linked through the key value index tree.

13. The method as claimed in claim 11 further comprising: executing a real-time operating system for coordinating support functions by the device processor.

14. The method as claimed in claim 11 further comprising: executing a garbage collection block on the non-volatile memory array including temporarily holding the user data in a volatile memory.

15. The method as claimed in claim 11 further comprising: executing a wear leveling block on the non-volatile memory array by the device processor.

16. The method as claimed in claim 11 further comprising: accessing a previous version of the user data by accessing metadata, for the key value, that identifies a location of the previous version of the user data.

17. The method as claimed in in claim 11 further comprising: executing a read operation module or a write operation module based on the key value index list.

18. The method as claimed in claim 11 further comprising: accepting the key value transfer through a device coupling structure including accessing the key value device driver configured to provide direct communication through the device coupling structure and bypassing customary I/O storage stacks.

19. The method as claimed in claim 11 further comprising: accepting the key value transfer generated by the key value device driver loaded in a system memory of a host processor.

20. The method as claimed in claim 11 further comprising: accepting the key value transfer generated by a key value device driver loaded in a user space of a system memory of a host processor.

* * * * *

UNITED STATES PATENT AND TRADEMARK OFFICE
CERTIFICATE OF CORRECTION

| | |
|---|---|
| PATENT NO. | : 11,630,578 B2 |
| APPLICATION NO. | : 16/887341 |
| DATED | : April 18, 2023 |
| INVENTOR(S) | : Sushma Devendrappa et al. |

It is certified that error appears in the above-identified patent and that said Letters Patent is hereby corrected as shown below:

On the Title Page

Item (72) "Inventors", Line 2, remove (US); James Liu, Fremont, CA (US); insert -- (US); Fei Liu, Fremont, CA (US); --

Signed and Sealed this
First Day of August, 2023

Katherine Kelly Vidal
*Director of the United States Patent and Trademark Office*